United States Patent [19]

Kerkar et al.

[11] Patent Number: 5,679,150

[45] Date of Patent: Oct. 21, 1997

[54] DRYING SHRINKAGE CEMENT ADMIXTURE

[76] Inventors: Awdhoot Vasant Kerkar, 7042 Ivoryhand Pl., Columbia, Md. 21045; Michael Paul Dallaire, 103 Henry Law Ave., Dover, N.H. 03820

[21] Appl. No.: 699,885

[22] Filed: Aug. 16, 1996

[51] Int. Cl.$^6$ ................................ C04B 24/02; C04B 24/12
[52] U.S. Cl. ........................ 106/808; 106/725; 106/727; 106/823; 524/4
[58] Field of Search ...................................... 106/727, 808, 106/725, 823; 524/4

[56] References Cited

U.S. PATENT DOCUMENTS

| | | | |
|---|---|---|---|
| 3,663,251 | 5/1972 | Moren et al. | 106/809 |
| 4,209,337 | 6/1980 | Wagner et al. | 196/671 |
| 4,223,732 | 9/1980 | Carriay et al. | 166/291 |
| 4,547,223 | 10/1985 | Goto et al. | 106/802 |
| 4,814,014 | 3/1989 | Arfaei | 106/724 |
| 4,960,465 | 10/1990 | Arfaei | 106/724 |
| 5,099,922 | 3/1992 | Ganguli | 166/293 |
| 5,133,409 | 7/1992 | Bour et al. | 166/293 |
| 5,147,565 | 9/1992 | Bour et al. | 252/8.551 |
| 5,174,820 | 12/1992 | Sakuta et al. | 106/724 |
| 5,213,161 | 5/1993 | King et al. | 166/293 |
| 5,220,960 | 6/1993 | Totten et al. | 166/293 |
| 5,275,654 | 1/1994 | Cowan | 106/802 |
| 5,281,270 | 1/1994 | Totten et al. | 106/687 |
| 5,298,069 | 3/1994 | King et al. | 106/686 |
| 5,298,070 | 3/1994 | Cowan | 106/724 |
| 5,330,006 | 7/1994 | Nahm et al. | 166/293 |
| 5,556,460 | 9/1996 | Berke et al. | 106/823 |

FOREIGN PATENT DOCUMENTS

| | | |
|---|---|---|
| 5547259 | 4/1980 | Japan . |
| 58140364 | 8/1983 | Japan . |

OTHER PUBLICATIONS

Chemical Admixtures for Concrete, M. R. Rixom and N.P. Mailvaganam, E. & E. F. Spon, London, New York (second edition) (1986).

*Primary Examiner*—Anthony Green
*Attorney, Agent, or Firm*—Howard J. Troffkin

[57] ABSTRACT

A cement admixture composition composed of an oxyalkylene compound and betaine. The betaine permits air entrainment in the presence of the oxyalkylene compound, which is used as a shrinkage reduction aid.

20 Claims, No Drawings

DRYING SHRINKAGE CEMENT ADMIXTURE

BACKGROUND OF INVENTION

The present invention is directed to a cement admixture composition capable of causing the combined effects of inhibiting drying shrinkage of hydraulic cement-based compositions while permitting air entrainment to be imparted thereto. The present invention further provides an improved architectural structural concrete formation.

Specifically, the present invention is directed to a cement admixture composed of a combination of (i) an oxyalkylene compound comprising at least an oxyalkylene ether adduct and (ii) betaine.

Hydraulic cement compositions, such as mortar (cement, small particulate, e.g. sand, and water), or concrete (cement, small particulate, large particulate, e.g. gravel, and water), are used extensively in forming (either alone as a concrete formation or in combination with other elements as a mortar and brick formation) architectural structural formations. These compositions have certain properties which substantially affect their durability which include shrinkage which occurs during drying and curing of the cement composition and the amount of air entrained in the resultant cast formation.

Conventional hydraulic cement compositions display a decrease in volume with setting and drying of the cast composition. Although the magnitude of the volume decrease is normally small, it is of extreme importance. This shrinkage results in cracks and other defects which lower the serviceability and durability of the resultant structure. The cracks provide a path for air to penetrate into the structure, promoting carbonation of the cement and corrosion of the metal reinforcing bars contained therein. Further, the cracks provide a means for water to seep into and through the structure. Such water entry further deteriorates the structure through freeze-thaw cycling pressures exerted on the cement structure over its life. It is highly desired to provide a cement which exhibits high strength and is not subject to deterioration effects due to shrinkage and freeze-thaw cycling.

Various attempts have been made to avoid the cracking phenomenon caused by drying shrinkage. For example, these include providing joints in a concrete structure to concentrate the site of crack formation at the joint and, thereby, minimize such formation at other portions of the structure. Such joints are expensive to install; are not applicable to certain structures and merely concentrate the area of cracking but do not alleviate it.

Other attempts include varying the composition of the cement, varying the methods of manufacture of concrete mix and varying the mix-proportion of aggregate material used in forming the resultant concrete structure. None of these attempts have resulted in a satisfactory solution. For example, cements have been formulated with expansive admixtures in attempts to counter the shrinkage of the concrete. However, it is difficult to determine the proper amount of expansive admixture required to counter the drying shrinkage which develops. The use of such materials thereby give rise to unpredictable results.

With respect to overcoming the drying shrinkage of cement compositions, such as concrete compositions, the literature teaches that various oxyalkylene adducts are suitable for this purpose. For example, U.S. Pat. Nos. 3,663,251 and 4,547,223 suggest the use of compounds of the general formula $RO(AO)_nH$ in which R may be a $C_{1-7}$ alkyl or $C_{5-6}$ cycloalkyl radical, A may be $C_{2-3}$ alkylene radicals and n is 1–10, as shrinkage reducing additives for cement. Similarly, it is known that terminally alkyletherified or alkylesterified oxyalkylene polymers are useful for shrinkage reduction. Still further, it is known that shrinkage reduction of cement can be accomplished by the addition thereto of compounds which are aliphatic, alicyclic or aromatic group terminated oxyethylene and/or oxypropylene repeating chain compounds.

In addition to addressing cracking due to dry shrinkage, the art has also had to address cement deterioration due to freeze-thaw pressures. The freeze-thaw pressures encountered by conventional hydraulic cement structures are on a micro-scale (including crack phenomenon) and are due to water seeping into the porous cement structure, where the water then resides to exert deteriorating pressure under freeze-thaw conditions. In order to prevent the loss of durability due to this phenomenon, it is common practice to incorporate small amounts of agents capable of causing the entrainment of fine air voids in the hardened hydraulic cement composition structure. These agents are known as "air entraining (AE)" agents and are well known. These agents include, for example, tall oil fatty acids and their esters, gum resins and rosins, sulfite liquors and the like. The resultant air voids (normally about 3–10, preferably 4–8 volume percent in concrete or from about 15–30, preferably 15–25 volume percent in mortar) provide empty space for expansive ice crystals to grow into relieving the pressure of water expansion under freeze-thaw conditions.

While oxyalkylene compounds provide a degree of shrinkage inhibition to cement structures, they have been known to cause a deactivation of conventional air entraining agents and, therefore, cause such treated cement structures to have an undesired low degree of air entrainment and/or require a very high dosage of AE agent (which has many disadvantages from a practical and economic standpoint). As mentioned above, it is known that air entrainment is desired to aid in permitting the cast cement structure to accomodate the expansion and compression of water when it freezes and thaws. The alkylene oxide adducts described above do not permit the structure to have sufficient air entrainment, as required, to provide a structure capable of withstanding compressive/expansive forces and, thereby, extend the structure's useful life. For example, U.S. Pat. No. 3,663,251 shows, by comparative examples, that the inclusion of a polypropylene glycol causes a reduction of the air entrainment provided by the cement being treated with an agent composed of sulfite waste liquor. Further, Canadian Patent 967,321 suggests that polyoxyalkylene glycols as well as their esters, ethers and mixture cause a reduction in foaming in cementitious compositions.

It, therefore, is highly desired to provide a cement admixture which is capable of inhibiting drying shrinkage of structural cement compositions without inhibiting the ability of conventional air entraining agents to impart sufficient fine air voids in a hardened hydraulic cement composition.

Further, it is desired to provide a stable cement admixture which is capable of inhibiting drying shrinkage of structural cement composition while permitting the imparting of desired degree of air entrainment using conventional AE agents to provide a structure capable of withstanding compressive/expansive forces and, thereby, extend the structure's useful life.

SUMMARY OF INVENTION

The present invention is directed to a cement admixture, and to a method of forming an improved architectural cement composition formation, which is capable of inhibiting drying shrinkage without detracting from the ability of the composition to substantially maintain air void content in the resultant formation. The admixture comprises an oxyalkylene compound such as an oxyalkylene ether adduct and a betaine. Therefore, when one employs cement compositions comprising this invention, which includes the shrinkage reduction aids described above, one can still obtain an air entrained cement composition using conventional air entraining agents, at conventional amounts. The description and examples below show that absent the present invention, inferior air entrainment occurs when using conventional amounts of conventional air entraining agents in cement compositions comprising the oxyalkylene shrinkage reduction agent.

DETAILED DESCRIPTION OF THE INVENTION

It has been unexpectedly found that when an oxyalkylene compound, as fully describe hereinbelow, is combined with a minor amount of betaine, as fully described herein below, one attains a cement admixture composition which not only inhibits drying shrinkage of a treated cement structure, but also, if desired, permits one to impart air entrainment using conventional amounts of known AE agents. For the purposes of this invention a betaine is defined as a compound comprising an internal salt of a quaternary ammonium.

The subject cement admixture requires the use of an oxyalkylene compound which is an oxyalkylene ether adduct. This ether adduct cap be used alone or in combination with (ii) oxyalkylene glycol and/or (iii) secondary and/or tertiary alkylene glycols.

The oxyalkylene ether adduct is represented by the formula $RO(AO)_mH$ (Formula I) wherein R is hydrocarbon group, such as a $C_1$–$C_7$ alkyl or a $C_5$–$C_6$ cycloalkyl, preferable a $C_3C_5$ alkyl group. Examples of suitable R groups are methyl, ethyl, propyl, isopropyl, n-butyl, isobutyl, t-butyl, n-pentyl, isopentyl, cyclopentyl, cyclohexyl and the like. The preferred R groups are $C_3$–$C_5$ alkyl such as n-propyl, isopropyl, n-butyl, t-butyl and the like. A is a $C_2$–$C_4$ (preferably $C_2$–$C_3$) alkylene group, such as ethylene, propylene and the like and mixtures thereof in the same chain, and m is an integer of from 1 to about 10, and preferably m is 2–3.

The oxyalkylene glycol is represented by the formula $HO(AO)_nH$ (Formula II) where A represents a $C_2$–$C_4$ alkylene group such as ethylene, propylene, butylene and the like and mixtures thereof with ethylene and propylene being preferred; O represents an oxygen atom and n is an integer from 1 to 20. The AO groups in a particular glycol molecule may all be the same or may be different. Examples of such glycols include diethylene glycol, dipropylene glycol, tripropylene glycol, di(ethoxyy)di(propoxy) glycol and the like. Further such glycols may include polyalkylene glycols (poly(oxyalkylene)glycol) having molecular weights up to about 1200. The AO groups forming the chain of such glycols may contain a single type of alkylene ether group or a mixture of alkylene ether groups which may be in block or random arrangement.

The secondary or tertiary alkylene glycols useful in the present shrinkage reducing admixture are represented by the general formula HOBOH (Formula III) wherein B represents a $C_3$–$C_{12}$ alkylene group, preferably a $C_5$–$C_8$ alkylene group. The preferred glycols are secondary and/or tertiary dihydroxy $C_5$–$C_8$ alkanes which are represented by the formula (IV):

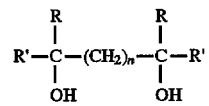

wherein each R independently represents a hydrogen atom or a $C_1$–$C_2$ alkyl group, each R' represents a $C_1$–$C_2$ alkyl group and n represents an integer of 1 or 2. The most preferred compound is 2-methyl-2,4-pentanediol. Another suitable glycol is 1,4-pentanediol.

One suitable type of betaine has the general formula (V) below,

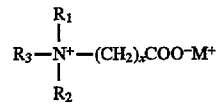

wherein $R_1$, $R_2$ and $R_3$ are independently alkyls or alkyl containing moieties, x is 1 to 5, and M is a metal cation, or ammonium. Suitable metal cations are derived from any of the alkali, e.g., sodium or alkaline earth metals. Ammonium salts also are suitable. The compounds of this invention are typically added as metal salts.

Preferably $R_1$ and $R_2$ are $C_1$–$C_4$ alkyls, and most preferably methyl. Preferable alkyl groups for $R_3$ are $C_{10}C_{28}$ and include alkyl-containing moieties such as alkylamides, alkyl amido alkylenes, and substituted alkyls such as hydroxyalkyls. It is particularly preferred that $R_3$ is a $C_{10}$–$C_{20}$ alkylamido propyl, such as lauramido propyl and cocamidopropyl. Other suitable betaines are listed in Table 2 below.

Another suitable type of betaine, a sulfobetaine, has the general formula VI

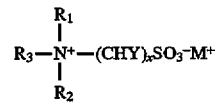

wherein $R_1$, $R_2$ and $R_3$, M and X are as described above and Y is hydrogen or hydroxyl. A preferred sulfobetaine is cocamido propyl hydroxy sultaine.

Other suitable betaines and sulfobetaines are disclosed in U.S. Pat. No. 4,209,337, the entire contents of which are incorporated herein by reference.

Methods for preparing betaines and sulfobetaines are known in the art. Typically, betaines are made by the reaction of chloroacetic acid with a tertiary amine. The reaction is carried out in an aqueous solution with caustic soda. Sulfobetaines can be prepared by the addition of epichlorohydrin to alkyl dimethyl amines and then sulfated using sodium bisulfite. See, for example, *Handbook of Surfactants*, pp. 189–90 and 194 (London 1991)

The subject cement admixture should contain a mixture of at least the above described oxyalkylene ether adduct and at least one betaine compound as described above. When the subject admixture is used as an improved admixture capable of inhibiting drying shrinkage of cement compositions without exhibiting deactivation of conventional AE agents to entrain air therein, the mixture needs to contain the betaine in catalytic amounts such as from about 0.01 to 2, preferably from 0.01 to 0.5 percent and most preferably 0.01 to 0.2 by weight based on oxyalkylene compound(s) forming the admixture. The exact amount of betaine required to counteract deactivation by the oxyalkylene component (to permit normal functioning of conventional AE agents) will depend on the particular oxyalkylene compound used to form the admixture, the type of cement used and the temperature of the cement composition when it is poured. This amount can be readily determined by the artisan using well known techniques. The use of certain cement additives, e.g., plasticizers also may affect how much betaine is used. The admixture also can be used over a wide range of pH.

As stated above, it has been unexpectedly found that combining catalytic amounts of betaine to the oxyalkylene compounds described above provides an admixture which, if desired, can be further treated with conventional AE agents at conventional amounts to impart the desired air void volume in the set formation. Air enhancing agents which can be employed with this invention include abletic and pimeric acid salts prepared from tall oil processing, fatty acid salts, alkyl aryl sulfonates, alkyl sulfates and phenol ethoxylates. Examples of each class include, but are not limited to, oleic or capric acid, orthododecyl benzene sulfonate, sodium dodecyl sulfate, and nonylphenol ethoxylate.

The present cement admixture may be added to the hydraulic cement or to the cement composition. For example, the present admixture can be applied to cement powder during blending with other materials to prepare a specific type of cement. Alternately, an improved cement composition can be formed in situ during the course of preparing a cement composition, such as a mortar or a concrete. The admixture can be added separately or as part of the water of hydration.

The present admixture may be either a neat composition (a liquid having only oxyalkylene compound and betaine) or as an aqueous solution. The present admixture is a stable solution which does not separate over time. Thus, the admixture is storage stable and can be readily dispensed without concern about proper dosage of each component or require agitation of the storage drum to cause mixing of the components.

The present cement admixture should be used in from about 0.1 to about 5, preferably from about 0.5 to 3 and most preferably from about 1 to 3 weight percent based on the hydraulic cement content of the cement composition (mortar or concrete) being treated. The oxyalkylene compound used can be present up to 4% by weight of the cement, but preferably is less than 2%.

Alternatively, conventional techniques can be used to add the betaine to a cement composition already containing the oxyalkylene compound. As discussed earlier, such cement compositions are designed with those compounds in order to reduce dry shrinkage. In such an application the betaine should be added to obtain the amount discussed above with respect to the oxyalkylene compound. Generally, in such applications, betaine will be added to the cement in from about 0.0005 to about 0.005 percent by weight based on the hydraulic cement present in the cement composition.

The cement composition of this invention can be formed with conventional amounts of water, such as a water to cement ratio of from 0.25:1 to 0.7:1 and preferably from 0.3:1 to 0.5:1. Aggregate, such as pebble, gravel, sand, pumice, fired perlite and the like may be employed in conventional amounts. The exact amount will depend upon the particular application and the standard (ASTM or the equivalent) which is applicable.

Various additional ingredients may be optionally employed to form the cement composition. Such ingredients include set accelerators as, for example, metal halides, metal sulfates, metal nitrites and the like; set retarders as, for example, alcohols, sugars, starch, cellulose and the like; corrosion inhibitors as, for example, alkali metal nitrates, alkali metal nitrites and the like; water reducing agents and superplasticizers, as for example, lignin sulfonic acid, condensation products of naphthalene sulfonate-formaldehyde and melamine sulfonate-formaldehyde, polyacrylates, and the like. These optional ingredients are normally employed in from about 0.05 to 6 percent by weight based on the weight of the cement contained in the cement composition.

As stated above, a cement admixture of this invention inhibits shrinkage in cement compositions containing the same, but also does not interfere with the effectiveness of any AE agents that may be used. Therefore, cement compositions containing this invention can be treated with conventional AE agents to impart the desired amount of micro air voids in the resultant formation. It is normally desired to have between about 4 to 10 volume percent air voids in the resultant concrete structure. AE agents are normally used in from 25 to $75 \times 10^{-4}$ percent based on the cement content of the treated composition. The betaine used in the admixture also does not adversely affect the performance of the SRA to any significant extent.

The components of the invention admixture also do not entrain air to any significant extent absent the addition of conventional AEA's. This is an advantage in the event air entrainers are not necessary, e.g., the SRA containing admixture is used in cement compositions for climates which do not have freeze-thaw conditions. As is well known in the art, while air entrainers do act to enhance a cement composition's durability, they also reduce the strength of the cement. Therefore, when a manufacturer makes a cement composition for environments which do not require AEA's, the use of this invention will not significantly affect the resulting cement composition's ultimate strength. However, at the same time, this invention also allows the manufacturer to market and use compositions comprising this invention in areas in which air entrainment agents will be used.

The resultant cement composition containing the subject admixture may be applied in conventional manners. The composition may be cast and troweled or injected and cured by air drying, wet air, steam assisted or the like.

The resultant cement composition provides an architectural structural formation which has the desired air void volume and substantial decrease in cracking due to drying shrinkage. The formation has enhanced durability.

The following examples are given for illustrative purposes only and are not meant to be a limitation on the subject invention, as defined by the appended claims. All parts and percentages are by weight unless otherwise indicated.

EXAMPLE 1

A series of micro-concrete mixes were prepared to determine the effect on air content by a betaine additive, e.g., cocamidopropyl betaine, in combination with monoalkyl ether alkylene oxide adduct (dipropylene glycol-t-butyl ether, "DPTB"), aklylene oxide (dipropylene glycol, "DPG") and an air entraining agent (AEA), e.g., (a gum rosin product sold by W. R. Grace & Co.—Conn. under the trademark Daravair® 1000).

The micro-concrete was made by blending 800 parts of Type 1 Portland cement with a mixture of the following ASTM graded aggregates: 475 parts of F-95 sand, 432 parts of C-109 sand, 432 parts of C-185 sand, and 821 parts of 15-S sand. The dry blending was conducted to attain a uniform blend having an aggregate to cement ratio of 2.7. To the blend was added 400 parts of water containing Daravair 1000. The water to cement ratio was 0.50. The blend was mixed to provide a micro-concrete. This formed Sample 1 in Table 1 below.

The above was repeated except that the water content and the additional materials indicated in Table 1 below were added to the mix. The ratio of total liquid to cement (L/C) was maintained constant. The amount of water was reduced to account for the liquid admixture containing a shrinkage reducing aid (SRA) comprising the oxyalkylene adduct and glycol mentioned above. The air content was measured according to ASTM C-185 test procedure. The plastic air content was measured for each sample and the ability to impart air by the AEA was determined by the following equation. The equation takes into account the dosage of AEA and the amount of entrapped air in the reference mix without AEA.

The air efficiency of the AEA used was calculated in a manner to normalize the results. The air efficiency was attained by the ratio in which the the numerator is the air content of the tested sample minus 2 (the percentage of air of a sample having no AEA) divided by the dosage of AEA used and the denominator is the air content value of the reference minus 2 divided by the dosage of AEA used in the reference, all multiplied by one hundred.

82% compared to the reference. A slightly higher amount of betaine, viz. 0.035% (wt. of SRA) (Sample #5) entrains 32% air in the mortar corresponding to an air efficiency of 137% compared to the reference. At both 0.017% and 0.035% (Samples #6, and #7), betaine on its own (in the absence of Daravair 1000) entrains very small amount of air (10–12%). Thus, addition of betaine to the AEA formulation, unexpectedly, provides a synergistic combination which overcomes the deactivating effect of the SRA on Daravair 1000 and allows for air entrainment at a conventional dose of AEA.

Samples 6 and 7 also illustrate that in the event one does not want air entrained in a cement composition comprising this invention, the betaine component does not result in significant air entrainment. As mentioned above, this would be an advantage for a manufacturer because it allows the manufacturer to market its SRA-containing products in environments which require the use of AEA's, as well as market it and use the same composition in warmer environ-

TABLE 1

Effect of Betaine on Air Entrainment in Mortar Treated with SRA

| Sample # | SRA | Dosage (wt. of cement) | AEA | Dosage (wt. of cement) | Betaine Additive | Dosage (wt. of SRA) | Air Content | Air Efficiency |
|---|---|---|---|---|---|---|---|---|
| 1 | None | — | Daravair 1000 | 0.0072% | None | — | 24% | 100 |
| 2 | DPTB/DPG | 2% | Daravair 1000 | 0.0072% | None | — | 7% | 23 |
| 3 | DPTB/DPG | 2% | Daravair 1000 | 0.03% | None | — | 10.5 | 9.3 |
| 4 | DPTB/DPG | 2% | Daravair 1000 | 0.0072% | Betaine | 0.017% | 20% | 82 |
| 5 | DPTB/DPG | 2% | Daravair 1000 | 0.0072% | Betaine | 0.035% | 32% | 137 |
| 6 | DPTB/DPG | 2% | Daravair 1000 | 0.0 | Betaine | 0.017% | 10% | — |
| 7 | DPTB/DPG | 2% | Daravair 1000 | 0.0 | Betaine | 0.035% | 12% | — |
| 8 | DPTB/DPG | 2% | Daravair 1000 | 0.0 | None | — | 7% | 23 |

Experimental results in Table 1 highlight the unexpected effect betaine has on the entrainment of air in mortar treated with SRA (DPTB/DPG) using a conventional dose of Daravair 1000. As mentioned above, Sample 1 is a reference mortar which was not treated with SRA. At a normal dose of 0.0072% (wt. of cement) of AEA, 24 volume percent of air can be easily entrained in the mortar. Addition of 2% (by weight of cement) of the SRA (DPTB/DPG) to the mortar (Sample #2) adversely affects the ability of Daravair 1000 to entrain air. The air content of the mortar mix drops to 7% with a resultant drop in air efficiency to 23% (compared to Sample 1). Indeed, Sample 8 shows that conventional amounts of Daravair is essentially ineffective as an AEA in the presence of SRA. Adding higher amount of Daravair 1000 to the mortar treated with 2% SRA (Sample #3) also does not entrain the target air content in the mortar (air efficiency 9.3%) indicating the deactivating effect of the SRA on the AEA.

Addition of 0.017% (wt. of SRA) of betaine to the mortar treated with 2% SRA (Sample #4), on the other hand, results in an air content of 20% at the same dosage of Daravair 1000 used in Sample 1. This corresponds to an air efficiency of ments which do not require the use of AEA's, e.g., those environments which do not have significant freeze-thaw cycles.

EXAMPLE 2

The tests in Example 1 were repeated with other commercially available betaines. However, in this series of samples betaine was used at 0.175% by weight of the SRA. The SRA comprised 1.33% DPTB and 0.67% DPG of the cement. As with Example 1, control samples were conducted for this example. One control comprised 0.0072% Daravair 1000 and 2% SRA. This reference sample, which is not shown in Table 2, had a air content of 8%. The other control comprised of no SRA and 0.0072% AEA. This reference sample which is also not shown in Table 2 below had an air content of 24%. Results of the test are summarized in Table 2 below. $R_1$, $R_2$ and $R_3$ correlate with the same substituents reflected in Formula V illustrated earlier.

The last sample listed in Table 2 illustrates that betaines in which $R_3$ is $C_{10}$ to to $C_{28}$ are preferable to betaines in which $R_3$ is an alkyl which contains less than ten carbons.

TABLE 2

Performance of Betaines in Entraining Air in Concrete Treated with SRA

| Betaine | $R_1$ | $R_2$ | $R_3$ | Air Content |
|---|---|---|---|---|
| Lauramidopropyl Betaine | $CH_3$ | $CH_3$ | $C_{11}H_{23}CONHCH_2CH_2CH_2$ | 37% |
| Isostearamidopropyl Betaine | $CH_3$ | $CH_3$ | iso-$C_{17}CONHCH_2CH_2CH_2$ | 28% |
| Oleoylamidopropyl Betaine | $CH_3$ | $CH_3$ | $C_{17}CONHCH_2CH_2CH_2$ | 32% |
| Oleoylamidopropyl Dimethyl Betaine | $CH_3$ | $CH_3$ | $C_{17}CONHCH_2CH_2CH_2$ | 32% |
| Lauryl/Myristyl Amidopropyl Betaine | $CH_3$ | $CH_3$ | $C11/C_{14}CONHCH_2CH_2CH_2$ | 36% |
| Cocamidopropyl Betaine, Ammonium Acetate | $CH_3$ | $CH_3$ | $C_{11}H_{23}CONHCH_2CH_2CH_2$ | 39% |
| Coco Betaine | $CH_3$ | $CH_3$ | $C_{12}H_{25}$ | 36% |
| Cocamidopropyl Hydroxysultaine* | $CH_3$ | $CH_3$ | $C_{11}H_{23}CONHCH_2CH_2CH_2$ | 37% |
| Soyamidopropyl Betaine | $CH_3$ | $CH_3$ | $C_{17}H_{35}CONHCH_2CH_2CH_2$ | 31% |
| Oleyl Betaine | $CH_3$ | $CH_3$ | $C_{17}H_{35}CONHCH_2CH_2CH_2$ | 28% |
| Caprylamidopropyl Betaine | $CH_3$ | $CH_3$ | $C_7H_{15}CONHCH_2CH_2CH_2$ | 8% |

EXAMPLE 3

Concrete mixes were formulated with a mix design of fine aggregate equal to 1100 pounds per cubic yard of West sand, 1700 pounds per cubic yard Wrenthan crushed stone (ASTM C-33 Grade 67), 658 pounds per cubic yard of Portland cement factor and a water (or water and indicated additives) to cement ratio of 0.46. The concrete mixtures were proportioned by the volumetric method according to ACI guidelines. The concrete was mixed according to ASTM C-192 test procedure. Plastic concrete tests to measure slump were conducted according to ASTM C-143; and plastic air content according to ASTM C-231.

Samples were formed with an AEA (Daravair 1000) only; with AEA and SRA, and with AEA, SRA and the betaine additive. The results are shown in Table 3 below. Reference concrete (Sample #1) entrains 6.2 volume % air in presence of 0.0072% (wt. of cement) of AEA corresponding 100% air efficiency. In presence of 2% SRA (Sample #2), the air efficiency of four-times the normal dose of Daravair (0.0288% wt. of cement) drops to 32% of the reference. Adding 0.075% betaine to the formulation allows for 11% air entrainment with just 1.5 time the normal dose of AEA corresponding to an air efficiency of 143% in concrete treated with 2% SRA (Sample #3). The 0.075% betaine addition, however, entrains only 3.2 volume percent of air in concrete treated with 2% SRA (Sample #4). The data clearly indicates the unexpected behavior of betaine in combination with SRA to allow for air entrainment at normal doses of Daravair 1000.

It also has been observed that the air content for concrete compositions are generally lower than that found in the mortar compositions illustrated in Examples 1 and 2. It is believed that the entrained air congregates as bubbles on the surface area of the solids present in the cement composition. While the volume % of solids in concrete is the same as the volume % of solids in mortar, the solids in concrete are generally larger and present less surface area per unit volume on which the entrained air can collect. Therefore, the levels of entrained air is lower and the increases shown for concrete are less than that shown for mortar. Nevertheless, the increase in air efficiency levels when compared to their respective reference or control samples are about the same.

TABLE 3

Effect of Betaine on Air Entrainment in Concrete Treated with SRA

| Sample # | SRA | Dosage (wt. of cement) | AEA | Dosage oz. per 100 wt. cement | Betaine | Dosage (wt. of SRA) | Air Content | Air Efficiency |
|---|---|---|---|---|---|---|---|---|
| 1 | None | — | Daravair 1000 | 1.0 | None | — | 6.2 | — |
| 2 | DPTB/DPG | 2% | Daravair 1000 | 4.0 | None | — | 7.4 | 32 |
| 3 | DPTB/DPG | 2% | Daravair 1000 | 1.5 | Betaine | 0.075% | 11 | 143 |
| 4 | DPTB/DPG | 2% | Daravair 1000 | 0.0 | Betaine | 0.075% | 3.2 | — |

EXAMPLE 4

The procedure in Example 3 above was repeated except, the concrete was treated with a high range water-reducer and plasticizer, viz., naphthalene sulfonate formaldehyde condensate sold by W. R. Grace & Co.—Conn. under trademark WRDA-19. This compound is added to lower the water content of concrete mixes without affecting the slump. Lower water content concrete is known to have less shrinkage and good long-term durability. Mix design proportions were altered to reflect the reduced water content of the concrete. The water (or water and indicated additives) cement ratio was 0.40. The fine aggregate content was increased to 1300 pounds per cubic yard for volumetric yield purposes. Once again, the use of SRAs affect the ability of AEA to entrain air in concrete and more so in the presence of WRDA-19. A higher level of betaine (0.15%) was utilized due to the increased difficulty in entraining air with superplasticizers.

Data in Table 4 highlights the effectiveness of betaine allowing air entrainment in concrete treated with SRA and WRDA-19. In presence of 2% SRA (Sample #2), the air efficiency of twice the normal dose of Daravair (0.0144% wt. of cement) drops to 44% of the reference. Adding 0.15% betaine to the formulation allows for 6% air entrainment with the same dose of AEA required for the reference superplasticized concrete, thus obtaining a 100% air efficiency value. The 0.15% betaine addition, however, entrains only 3.5 volume percent of air in concrete treated with 2% SRA (Sample #4). The data clearly indicates the unexpected behavior of betaine in combination with SRA to allow for air entrainment at normal doses of Daravair 1000.

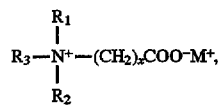

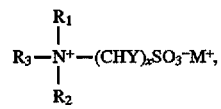

TABLE 4

Effect of Betaine on Air Entrainment in Superplasticized Concrete Treated with SRA

| Sample # | SRA | Dosage (wt. of cement) | AEA | Dosage (oz. per 100 wt. cement) | Betaine Additive | Dosage (wt. of SRA) | Air Content | Air Efficiency |
|---|---|---|---|---|---|---|---|---|
| 1 | None | — | Daravair 1000 | 2.0 | None | — | 6.0 | — |
| 2 | DPTB/DPG | 2% | Daravair 1000 | 4.0 | None | — | 5.5 | 44 |
| 3 | DPTB/DPG | 2% | Daravair 1000 | 2.0 | Betaine | 0.15% | 6.0 | 100 |
| 4 | DPTB/DPG | 2% | Daravair 1000 | 0.0 | Betaine | 0.15% | 3.5 | — |

Note: All Mixes Contain 8 oz/cwt of WRDA-19 superplasticizer

What is claimed is:

1. A cement admixture capable of inhibiting drying shrinkage while allowing air entrainment in a cement composition, the admixture comprising:

(A) oxyalkylene ether adduct represented by the formula RO(AO)$_m$H wherein R represents a $C_1$–$C_7$ alkyl or a $C_5$–$C_6$ cycloalkyl group, A represents a $C_2$–$C_4$ alkylene group, O represents an oxygen atom and m represents an integer of from 1 to about 10; and (B) at least one betaine, wherein component (B) is present from about 0.01–2.0% by weight of component (A).

2. The admixture of claim 1 wherein component A further comprises a compound selected from the group consisting of (i) oxyalkylene glycol represented by the formula HO(AO)$_n$H wherein A represents a $C_2$–$C_4$ alkylene group, O represents an oxygen atom, and n represents an integer of from 1 to about 20 and (ii) glycol represented by the formula HO—B—OH wherein B represents a $C_3$–$C_2$ alkylene and at least one of the —OH groups is attached to a secondary or tertiary carbon.

3. The admixture of claim 1 wherein the oxyalkylene ether adduct is selected from at least one oxyalkylene adduct of a monoalcohol wherein R is a $C_3$–$C_5$ alkyl and A is a $C_2$–$C_3$ alkylene group.

4. The admixture of claim 2 wherein the oxyalkylene glycol is selected from polypropylene glycol, polyethylene glycol or poly(oxyethylene)(oxypropylene) glycol wherein each of the oxyethylene and oxypropylene groups may have a random or block distribution.

5. The admixture of claim 3 wherein the oxyalkylene ether adduct of a monohydric alcohol has A representing propylene groups, R representing butyl groups and m represents 2 or 3.

6. The admixture of claim 1 wherein the betaine is selected from the group consisting of wherein $R_1$ and $R_2$ independently represent $C_1$–$C_4$ alkyls, and $R_3$ is selected from the group consisting of $C_{10}$–$C_{28}$ alkyl, $C_{10}$–$C_{28}$ alkylamido, $C_{10}$–$C_{28}$ alkylamide alkylene and substituted $C_{10}$–$C_{28}$ alkyl; Y is hydrogen or hydroxyl, x is 1 to 5; $R_4$ is a $C_1$–$C_{28}$ alkyl and n is 1 to 5; and M is a metal cation or ammonmium.

7. The admixture of claim 6 wherein $R_3$ is $C_{10}$–$C_{20}$ alkyl.

8. The admixture of claim 7 wherein the alkyl is alkyl amido alkylene.

9. The admixture of claim 8 wherein the alkylene is a $C_3$ alkyl.

10. The admixture of claim 8 wherein $R_3$ is cocamido propyl.

11. The admixture of claim 1 wherein component (B) is present from about 0.01–0.2% by weight of component (A).

12. The admixture of claim 10 wherein component (B) is present from about 0.01–0.2% by weight of component (A).

13. The admixture of claim 1 further comprising an air entraining agent.

14. The admixture of claim 13 wherein the air entraining agent is a gum rosin.

15. A method of inhibiting dry shrinkage in cement compositions while imparting the ability to provide air void content to formations formed from said composition comprising introducing an admixture into a cement composition in an amount ranging from 0.1 to about 5 weight percent based on the cement contained in said composition wherein the admixture comprises:

(A) oxyalkylene ether adduct represented by the formula RO(AO)$_m$H wherein R represents a $C_1$–$C_7$ alkyl or a $C_5$–$C_6$ cycloalkyl group, A represents a $C_2$–$C_4$ alkylene group, O represents an oxygen atom and m represents an integer of from 1 to 10; and (B) at least one betaine wherein component (B) is present from about 0.01–2.0% by weight of component (A).

16. The method of claim 15 wherein the cement composition is a concrete composition comprised of hydraulic cement, small aggregate, aggregate which is larger relative to the small aggregate and water.

17. A cement composition comprising:
(A) oxyalkylene ether adduct represented by the formula RO(AO)$_m$H wherein R represents a C$_1$–C$_7$ alkyl or a C$_5$–C$_6$ cycloalkyl group, A represents a C$_2$–C$_4$ alkylene group, O represents an oxygen atom and m represents an integer of from 1 to 10; and
(B) at least one betaine is present from about 0.01–2.0% by weight of component (A) and wherein the combination of (A) and (B) comprises 0.15% by weight of the cement.

18. The cement composition of claim 17 further comprising hydraulic cement, small aggregate, aggregate which is larger relative to the small aggregate and water wherein the ratio of water to cement is 0.25 to 0.7 and the combination of (A) and (B) is 0.01–1.00% by weight of the total cement composition.

19. The cement composition of claim 17 wherein (B) is a betaine selected from the group consisting of

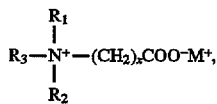

and

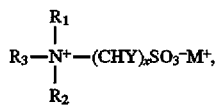

wherein R$_1$ and R$_2$ independently represent C$_1$–C$_4$ alkyls, and R$_3$ is selected from the group consisting of C$_{10}$–C$_{28}$ alkyl, C$_{10}$–C$_{28}$ alkylamido, C$_{10}$–C$_{28}$ alkylamide alkylene and substituted C$_{10}$–C$_{28}$ alkyl; Y is hydrogen or hydroxyl, x is 1 to 5; R$_4$ is a C$_1$–C$_{28}$ alkyl and n is 1 to 5; and M is a metal cation or ammonium.

20. The cement composition of claim 18 wherein (B) is a betaine selected from the group consisting of

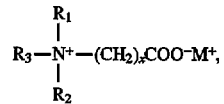

and

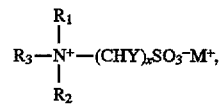

wherein R$_1$, and R$_2$ independently represent C$_1$–C$_4$ alkyls, and R$_3$ is selected from the group consisting of C$_{10}$–C$_{28}$ alkylamido, C$_{10}$–C$_{28}$ alkylamido, C$_{10}$–C$_{28}$ alkylamide alkylene and substituted C$_{10}$–C$_{28}$ alkyl; Y is hydrogen or hydroxyl, x is 1 to 5; R$_4$ is a C$_1$–C$_{28}$ alkyl and n is 1 to 5; and M is a metal cation or ammonium.

* * * * *